United States Patent
Kim et al.

(10) Patent No.: US 12,244,749 B2
(45) Date of Patent: Mar. 4, 2025

(54) METHOD FOR CONTROLLING FLEXIBLE DISPLAY AND ELECTRONIC DEVICE SUPPORTING THE SAME

(71) Applicant: Samsung Electronics Co., Ltd., Suwon-si (KR)

(72) Inventors: Hankon Kim, Suwon-si (KR); Junghyung Kim, Suwon-si (KR); Daehee Park, Suwon-si (KR); Junkyu Park, Suwon-si (KR); Dongil Son, Suwon-si (KR); Jaehoon Song, Suwon-si (KR); Seungbo Shim, Suwon-si (KR); Duhoon Jung, Suwon-si (KR); Myungkyoon Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 17/992,333

(22) Filed: Nov. 22, 2022

(65) Prior Publication Data

US 2023/0079189 A1  Mar. 16, 2023

Related U.S. Application Data

(63) Continuation of application No. PCT/KR2022/005728, filed on Apr. 21, 2022.

(30) Foreign Application Priority Data

Apr. 21, 2021  (KR) ........................ 10-2021-0051848

(51) Int. Cl.
*G06F 3/01* (2006.01)
*H02K 7/14* (2006.01)
*H04M 1/02* (2006.01)

(52) U.S. Cl.
CPC .......... *H04M 1/0268* (2013.01); *G06F 3/011* (2013.01); *H02K 7/14* (2013.01); *H04M 1/0237* (2013.01)

(58) Field of Classification Search
CPC ........ G06F 1/16; G06F 1/1624; G06F 1/1652; G06F 3/011; H04M 1/0237;
(Continued)

(56) References Cited

U.S. PATENT DOCUMENTS 10,747,269 B1 * 8/2020 Choi ..................... G06F 1/1641
10,972,592 B2   4/2021 Song et al.
(Continued)

FOREIGN PATENT DOCUMENTS

CN   111474809 A    7/2020
KR   10-2009-0023501 A    3/2009
(Continued)

OTHER PUBLICATIONS

Extended European Search Report dated Jul. 1, 2024, issued in European Application No. 22792048.5-1218.
(Continued)

*Primary Examiner* — Ryan A Lubit
(74) *Attorney, Agent, or Firm* — Jefferson IP Law, LLP

(57) ABSTRACT

An electronic device is provided. The electronic device comprising a flexible display includes a first area and a second area extending from the first area, a motor module configured to move at least a part of the second area according to a driving state in the first state and the second state, and a processor electrically connected to the flexible display and the motor module. The processor identifies a characteristic value related to the motor module when being changed from the first state to the second state and controls the motor module such that an area exposed to the outside (Continued)

of the electronic device among the second area is changed based on the identified characteristic value.

20 Claims, 15 Drawing Sheets

(58) Field of Classification Search
CPC .......... H04M 1/0268; H04M 2201/34; H04M 2250/12; H02K 7/14
See application file for complete search history.

(56) References Cited

U.S. PATENT DOCUMENTS

| | | | |
|---|---|---|---|
| 10,976,775 B1* | 4/2021 | Cha | ...................... H05K 7/1401 |
| 12,058,432 B2 | 8/2024 | Yang | |
| 2009/0237872 A1 | 9/2009 | Bemelmans | |
| 2010/0167791 A1 | 7/2010 | Lim | |
| 2012/0212433 A1* | 8/2012 | Lee | ...................... G06F 1/1643 345/173 |
| 2017/0212607 A1 | 7/2017 | Yoon | |
| 2020/0264660 A1* | 8/2020 | Song | ................... G06F 1/1624 |
| 2020/0267247 A1* | 8/2020 | Song | ................... H04M 1/0237 |
| 2021/0373603 A1* | 12/2021 | Feng | ..................... G06F 1/1624 |
| 2021/0405703 A1* | 12/2021 | Song | ..................... G06F 1/1694 |
| 2022/0166861 A1* | 5/2022 | Lim | ..................... G06F 1/1681 |
| 2022/0311848 A1* | 9/2022 | Delaporte | ........... H04M 1/0268 |

FOREIGN PATENT DOCUMENTS

| | | | |
|---|---|---|---|
| KR | 10-2012-0095019 A | 8/2012 | |
| KR | 10-1562582 B1 | 10/2015 | |
| KR | 10-2016-0123201 A | 10/2016 | |
| KR | 10-2017-0008610 A | 1/2017 | |
| KR | 10-2017-0089664 A | 8/2017 | |
| KR | 10-2111376 B1 | 5/2020 | |
| KR | 10-2020-0117741 A | 10/2020 | |
| KR | 10-2020-0140582 A | 12/2020 | |
| KR | 10-2436558 B1 | 8/2022 | |

OTHER PUBLICATIONS

International Search Report dated Aug. 12, 2022, issued in International Patent Application No. PCT/KR2022/005728.
Saudi Arabia Substantive Examination Report dated Nov. 6, 2024, issued in Saudi Arabia Application No. 523451133.

* cited by examiner (500a)  (500b)

METHOD FOR CONTROLLING FLEXIBLE DISPLAY AND ELECTRONIC DEVICE SUPPORTING THE SAME

CROSS-REFERENCE TO RELATED APPLICATION(S)

This application is a continuation application, claiming priority under § 365(c), of an International application No. PCT/KR2022/005728, filed Apr. 21, 2022, which is based on and claims the benefit of a Korean patent application number 10-2021-0051848, filed on Apr. 21, 2021, in the Korean Intellectual Property Office, the disclosure of which is incorporated by reference herein in its entirety.

TECHNICAL FIELD

The disclosure relates to a method for controlling an expansion state and a reduction state of a flexible display, and an electronic device supporting the same.

BACKGROUND ART

An electronic device may display a screen in a display area of a flexible display. For example, the electronic device may display a screen in a first display area exposed to the outside of the electronic device in a first state of the flexible display (for example, display area reduction state), or may display a screen in the first display area and in at least a partial area of a second display area extending from the first display area in a second state of the flexible display (for example, display area expansion state).

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may switch from a first state to a second state to display a screen having a designated size or larger or multiple screens (for example, multi-window) in an expanded display area of a flexible display.

However, the electronic device may receive resistance from an external object (for example, user's hand) adjacent to the electronic device when switching from the first state to the second state. In this case, the electronic device may forcibly switch from the first state to the second state regardless of the intensity of resistance, or may return from the second state to the first state in the course of switching from the first state to the second state. If the electronic device switches from the first state to the second state regardless of the intensity of resistance, the motor for moving the first and second areas of the flexible display may be overloaded. On the other hand, if the electronic device returns from the second state to the first state in the course of switching from the first state to the second state regardless of the intensity of resistance, the electronic device may repeatedly switch from the first state to the second state or may repeatedly request an input for switching from the first state to the second state, thereby degrading usability of the flexible display.

Aspects of the disclosure are to address at least the above-mentioned problems and/or disadvantages and to provide at least the advantages described below. Accordingly, an aspect of the disclosure is to provide a flexible display control method and an electronic device supporting the same controlling a motor such that, when switching from a first state to a second state, an area exposed to the outside of the electronic device, among the display area of the flexible display, is changed according to resistance from an external object.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a flexible display which includes a first area and a second area extending from the first area and in which the first area is exposed to the outside of the electronic device in a first state and at least a part of the second area is exposed to the outside of the electronic device together with the first area in a second state different from the first state, a motor module configured to move at least a part of the second area according to a driving state in the first state and the second state, and a processor electrically connected to the flexible display and the motor module, wherein the processor identifies a characteristic value related to the motor module when being changed from the first state to the second state, and controls the motor module such that an area exposed to the outside of the electronic device among the second area is changed based on the identified characteristic value.

In accordance with another aspect of the disclosure, a control method for a flexible display is provided. The control method includes identifying, when being changed from a first state in which a first area of a flexible display is exposed to the outside of an electronic device to a second state in which at least a part of a second area of the flexible display extending from the first area is exposed to the outside of the electronic device together with the first area, a characteristic value related to a motor module configured to move at least a part of the second area, and controlling the motor module such that an area exposed to the outside of the electronic device among the second area is changed based on the identified characteristic value.

In accordance with another aspect of the disclosure, an electronic device is provided. The electronic device includes a flexible display which includes a first area and a second area extending from the first area and in which the first area is exposed to the outside of the electronic device in a first state and at least a part of the second area is exposed to the outside of the electronic device together with the first area in a second state different from the first state, a motor module configured to move at least a part of the second area according to a driving state in the first state and the second state, a plurality of sensors arranged in a partial area in a direction corresponding to the movement direction of the second area when being changed from the first state to the second state among the first area, and a processor electrically connected to the flexible display, the motor module, and the plurality of sensors, wherein the processor identifies a characteristic value related to the motor module when being changed from the first state to the second state, identifies an external force by using one of the plurality of sensors based on whether an input of a user gripping the electronic device is detected when being changed from the first state to the second state, and controls the motor module such that an area exposed to the outside of the electronic device among the second area is changed based on at least one of the identified characteristic value and the identified external force.

Advantageous Effects

According to various embodiments disclosed herein, a flexible display control method and an electronic device supporting the same may control a motor such that, when switching from a first state to a second state, an area exposed to the outside of the electronic device, among the display area of the flexible display, is changed according to resistance from an external object, thereby preventing the motor from being overloaded, and improving usability of the flexible display.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Figure 1A:
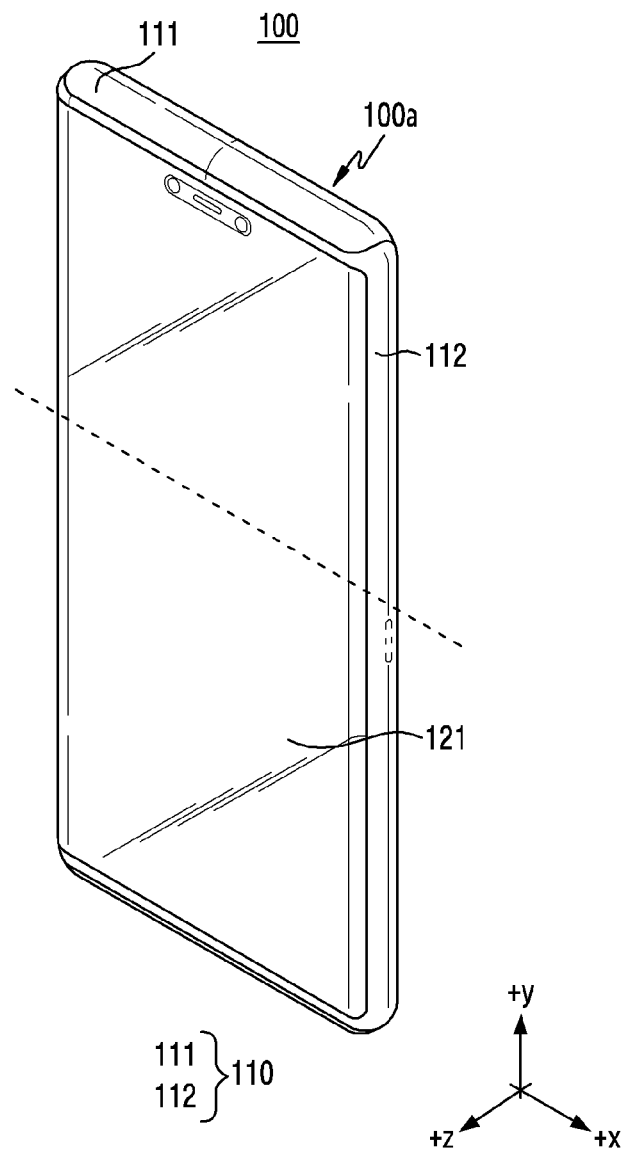
FIG. 1A is a view illustrating a front surface of an electronic device in a first state (e.g., a display area reduction state) according to an embodiment of the disclosure.

FIG. 1A is a view illustrating a front surface of an electronic device in a first state (e.g., a display area reduction state) according to an embodiment of the disclosure.

Figure 1B:
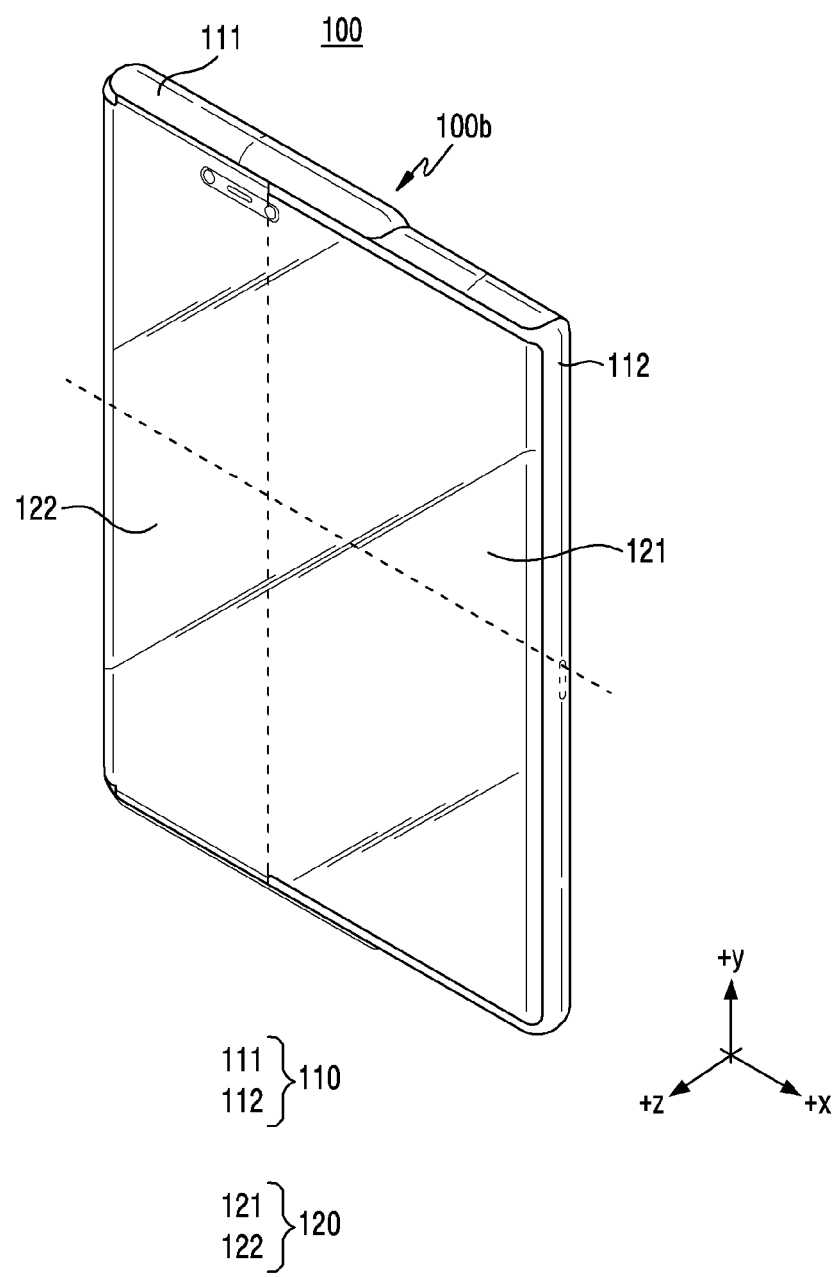
FIG. 1B is a view illustrating a front surface of an electronic device in a second state (e.g., a display area expansion state) according to an embodiment of the disclosure.

FIG. 1B is a view illustrating a front surface of an electronic device in a second state (e.g., a display area expansion state) according to an embodiment of the disclosure.

According to various embodiments disclosed herein, a surface facing a direction substantially identical to a direction in which at least a part (e.g., a first part 121) of a flexible display 120 of an electronic device 100 faces may be defined as a front surface of the electronic device 100, and a surface facing the front surface may be defined as a rear surface of the electronic device 100. A surface surrounding a space between the front surface and the rear surface may be defined as a side surface of the electronic device 100.

Referring to FIGS. 1A and 1B, a flexible display 120 may be disposed on at least a part of the electronic device 100 according to an embodiment. According to an embodiment, the flexible display 120 may be disposed to have a flat shape formed in at least a part thereof and curved shape formed in at least a part thereof. According to an embodiment, the flexible display 120 and a slidable housing 110 surrounding at least a part of an edge of the flexible display 120 may be arranged on the front surface of the electronic device 100.

According to an embodiment, the slidable housing 110 (e.g., a slidable type housing or a rollable type housing) may provide a partial area of a front surface (e.g., a surface of the electronic device 100, which faces the +z direction in FIGS.

1A and 1B), a rear surface (e.g., a surface of the electronic device 100, which faces the −z direction in FIGS. 1A and 1B), and a side surface (e.g., a surface which connects the front surface and the rear surface of the electronic device 100) of the electronic device 100. According to another embodiment, the slidable housing 110 may provide the rear surface and a partial area of the side surface of the electronic device 100.

According to an embodiment, the slidable housing 110 may include a first housing 111 and a second housing 112 coupled to the first housing to be movable within a predetermined range with respect thereto.

According to an embodiment, the flexible display 120 may include the first part 121 couplable to the second housing 112 and a second part 122 capable of extending from the first part 121 to be drawn into the electronic device 100.

According to an embodiment, the electronic device 100 may include a first state 100a and a second state 100b. For example, the first state 100a and the second state 100b of the electronic device 100 may be determined depending on a relative position of the second housing 112 with respect to the first housing 111, and the electronic device 100 may be configured to be changeable between the first state 100a and the second state by the mechanical operation or the user operation.

According to an embodiment, the first state 100a of the electronic device 100 may mean a state before the slidable housing 110 is expanded. The second state 100b of the electronic device 100 may mean a state in which at least a part of the slidable housing 110 is expanded.

According to an embodiment, when the electronic device is changed from the first state 100a to the second state 100b according to the movement of the second housing 112, the second part 122 of the flexible display 120 may be drawn out (or exposed) from the inside to the outside of the electronic device 100. According to an embodiment, the fact that the flexible display 120 is drawn out (or exposed) may mean that at least a part of the flexible display 120 is viewable from the outside of the electronic device 100. In another embodiment, when the electronic device 100 is changed from the second state 100b to the first state 100a according to the movement of the second housing 112, the second part 122 of the flexible display 120 may be drawn into the electronic device 100. According to an embodiment, the fact that the flexible display 120 is drawn thereinto may mean that at least a part of the flexible display 120 is not viewable from the outside of the electronic device 100.

Figure 2A:
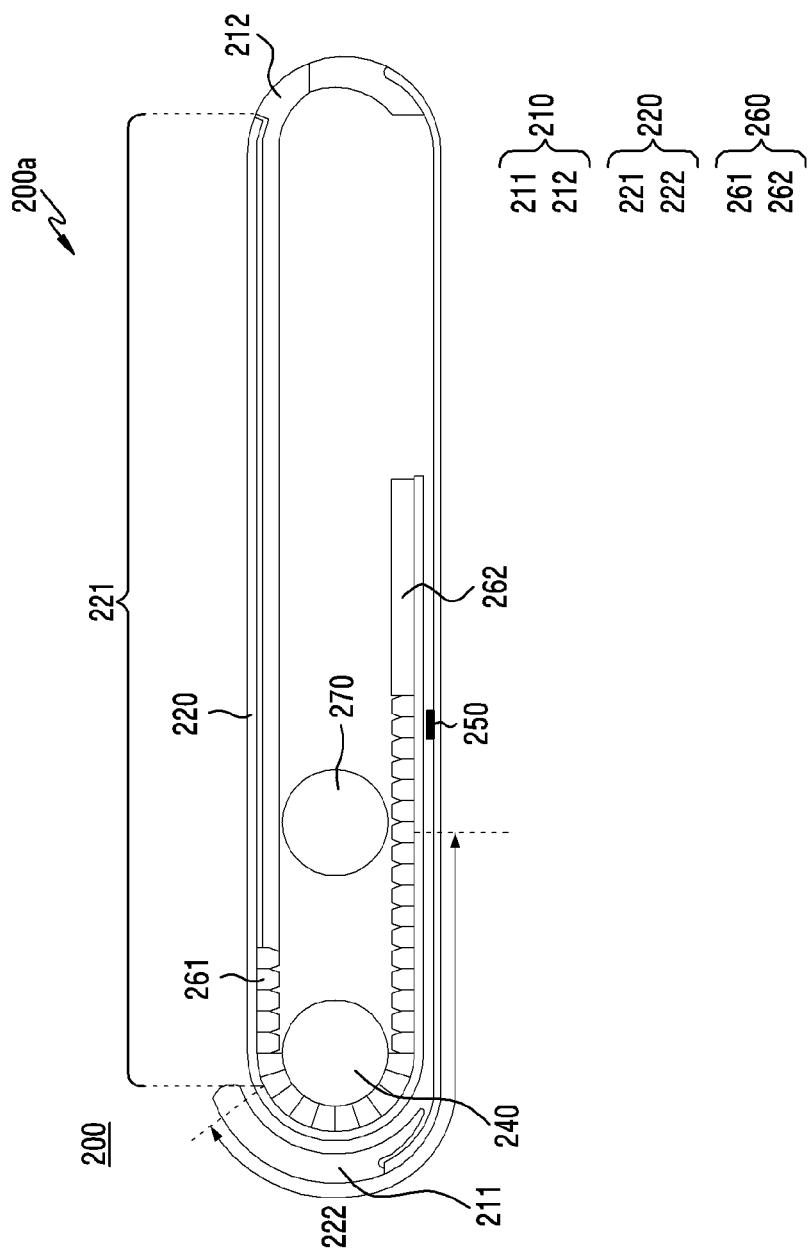
FIG. 2A is a view illustrating a cross-section of an electronic device in a first state (e.g., a display area reduction state) according to an embodiment of the disclosure.

FIG. 2A is a view illustrating a cross-section of an electronic device in a first state (e.g., a display area reduction state) according to an embodiment of the disclosure.

Figure 2B:
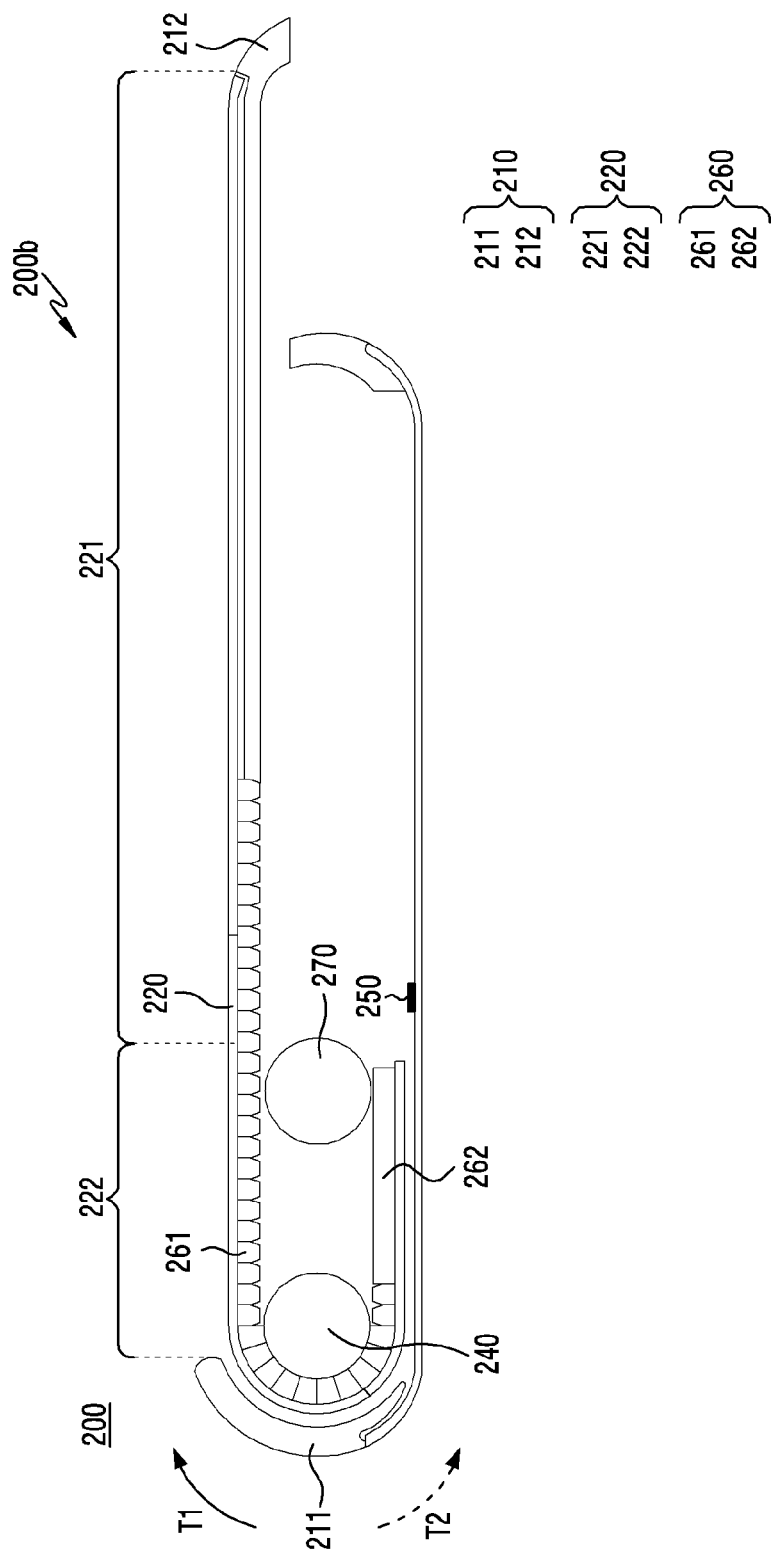
FIG. 2B is a view illustrating a cross-section of an electronic device in a second state (e.g., a display area expansion state) according to an embodiment of the disclosure.

FIG. 2B is a view illustrating a cross-section of an electronic device in a second state (e.g., a display area expansion state) according to an embodiment of the disclosure. In the description below, the description of the electronic device 100 may be applied to electronic device 200.

According to an embodiment, a first state may refer to a first shape, and a second state may refer to a second shape. For example, the first shape may include a normal state, a reduced state, or a closed state, and the second shape may include an extended state or an opened state.

Referring to FIGS. 2A and 2B, an electronic device 200 according to an embodiment may include at least one of a first housing 211 and a second housing 212 as at least part of a housing structure 210, a display 220, a roller 240, a sensor 250, a display support member 260, and a motor module 270.

According to an embodiment, the first housing 211 may provide at least a part of a side surface and/or a rear surface of the electronic device 200. According to an embodiment, the second housing 212 may provide at least a part of a front surface and/or a side surface of the electronic device 200. According to an embodiment, the display 220 may be coupled at least a part of the second housing 212.

According to an embodiment, a partial area of the display 220 may be disposed to overlap the second housing 212. For example, at least a partial area of one surface of the display 220 may be positioned on at least a partial area of the front surface of the second housing 212, and the other surface thereof may be disposed to be exposed to the outside.

According to an embodiment, the display support member 260 may include a plurality of joint structures 261 and a support plate 262. In an embodiment, a partial area of the plurality of joint structures 261 may be transformed during a process of changing the state of the electronic device 200. For example, a partial area of the plurality of joint structures 261 may be unfolded or bent to have a designated curvature during a process in which the electronic device 200 is changed from a first state 200a to a second state 200b or is changed from the second state 200b to the first state 200a. According to another embodiment, the second housing 212 may be fixed or coupled to one end of the plurality of joint structures 261, and a part of a first part 221 of the display 220 may be disposed at upper end of the second housing 212. In an embodiment, the support plate 262 may be fixed or coupled to one end of the plurality of joint structures 261.

According to an embodiment, the motor module 270 may move a second part 222 of the display 220 in a first rotation direction T1 or a second rotation direction T2 in a state of being connected at least a part of the display support member 260. In an example, the motor module 270, when being changed from the first state 200a to the second state 200b, may be engaged with at least a part of the plurality of joint structures 261 (e.g., a joint in a direction adjacent to the sensor 250) to rotate in the first rotation direction T1 so as to expose the second part 222 of the display 220 to the outside of the electronic device 200. In another example, the motor module 270, when being changed from the second state 200b to the first state 200a, may be engaged with at least another part of the plurality of joint structures 261 (e.g., a joint in a direction opposite to the sensor 250) to rotate in the second rotation direction T2 so as to draw the second part 222 of the display 220 into the electronic device 200. In various embodiments, an outer circumferential surface of the motor module 270 may have a sawtooth shape to be engaged with at least a part of the plurality of joint structures 261.

According to an embodiment, the roller 240 may come into contact with the plurality of joint structures 261 of the display support member 260, and the display support member 260 may move by means of the rotation of the roller 240 within a predetermined range. For example, when the roller 240 rotates in the first rotation direction T1 (e.g., a clockwise direction) in a process in which the electronic device 200 is changed from the first state 200a to the second state 200b, the display support member 260 may move in a first direction (e.g., a direction away from the roller 240) while a partial area of the plurality of bent joint structures 261 is unfolded. In another example, when the roller 240 rotates in the second rotation direction T2 (e.g., a counterclockwise direction) in a process in which the electronic device 200 is changed from the second state 200b to the first state 200a, the display support member 260 may move in a second direction (e.g., a direction opposite to the first direction)

while a partial area of the plurality of unfolded joint structures 261 is bent. According to an embodiment, as the shape of a partial area of the plurality of joint structures 261 is changed in a process in which the state of the electronic device 200 is changed, the shape of the second part 222 of the display 220 supported by the plurality of joint structures 261 may also be changed to correspond to the shape of the plurality of joint structures 261.

According to an embodiment, the display 220 may be disposed on an outer circumferential surface of the display support member 260, and the display 220 may move together with the display support member 260 by means of the rotation of the roller 240. According to an embodiment, the display 220 may include the first part 221 and/or the second part 222, the shape of which is changeable according to the state of the electronic device 200.

According to an embodiment, the first part 221 of the display 220 may be positioned at an upper end of a partial area of the plurality of joint structures 261 and the second housing 212 so as to be supported by the plurality of joint structures 261 and the second housing 212. According to an embodiment, the first part 221 of the display 220 may be exposed to the outside of the electronic device 200 regardless of the state (e.g., a first state or a second state) of the electronic device 200.

According to an embodiment, the second part 222 of the display 220 may be positioned at an upper end of a partial area of the plurality of joint structures 261 of the display support member 260 so as to be supported by the plurality of joint structures 261. According to an embodiment, the second part 222 of the display 220 may be exposed or not exposed to the outside of the electronic device 200 according to the state of the electronic device 200.

For example, when the electronic device 200 is in the first state 200a, the second part 222 of the display 220 may be supported by the plurality of joint structures 261 to be accommodated in an inner space of the electronic device 200 in a state of being wound around a rotation axis of the roller 240, and thus the second part 222 may not be exposed to the outside of the electronic device 200. In another example, when the electronic device 200 is changed from the first state 200a to the second state 200b, an area of adjacent to the first part 221 among the second part 222 of the display 220 may be drawn out from the inside of the electronic device 200. As a partial area of the second part 222, which is adjacent to the first part 221, is drawn out from the inside of the electronic device 200, a display area of the display 220 exposed to the outside of the electronic device 200 may be expanded. In still another example, when the electronic device 200 is changed from the second state 200b to the first state 200a, an area adjacent to the support plate 262 among the second part 222 exposed to the outside of the electronic device 200 may be drawn into the electronic device 200. As a partial area of the second part 222 adjacent to the support plate 262 is drawn into the electronic device 200, a display area of the display 220 exposed to the outside of the electronic device 200 may be reduced.

The electronic device 200 according to various embodiments is not limited to the configuration illustrated in FIGS. 2A and 2B. For example, the display 220 may be disposed to surround most of a front surface of the electronic device 200 and a part of a rear surface thereof so that a partial area of the display 220 is exposed to the outside in the rear surface even in the first state 200a.

According to an embodiment, at least one of the sensor 250 may be positioned in the electronic device 200. The electronic device 200 may sense a change in the state of the electronic device 200 by using at least one of the sensor 250. At least one of the sensor 250 according to an embodiment may include at least one of a hall sensor and a distance sensor, but is not limited thereto. For example, at least one of the sensor 250 may include at least one of an optical sensor, an ultrasonic distance sensor, a radio wave distance sensor, which can sense a state (e.g., the drawn-out state and the drawn-in state of the housing) of the electronic device 200 or a distance by which the second housing 212 has moved.

Figure 3:
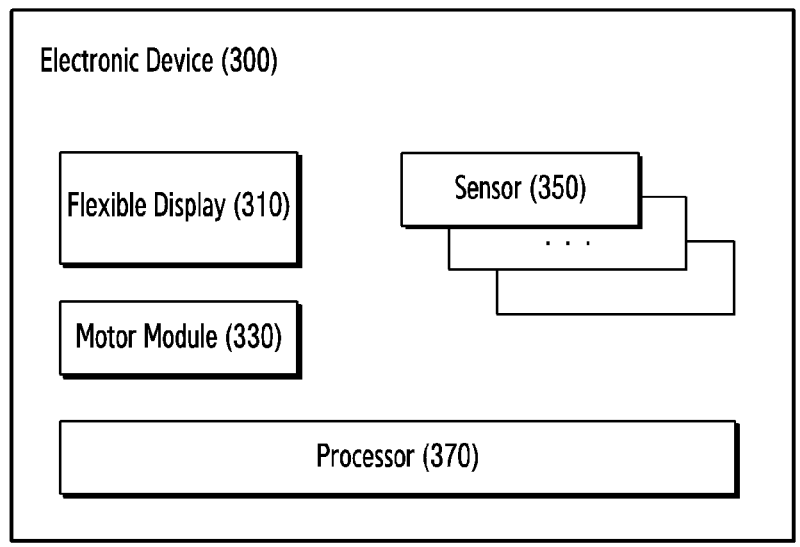
FIG. 3 is a block diagram of an electronic device according to an embodiment of the disclosure.

FIG. 3 is a block diagram of an electronic device according to an embodiment of the disclosure. According to various embodiments, electronic device 300 in FIG. 3 may perform a function (e.g., a state change function) related to a first state (e.g., a display area reduction state) and a second state (e.g., a display area expansion state) with reference to a structure of the electronic device 100 and 200 illustrated in FIGS. 1A, 1B, 2A, and 2B.

Referring to FIG. 3, an electronic device 300 may determine one of the first state and a detailed state (e.g., a partial expansion of a display area and an entire expansion of a display area) related to the second state according to an external factor (e.g., contact with an object or access of an object) and/or an internal factor (e.g., overload of a motor) when being changed from the first state to the second state.

Referring to FIG. 3, the electronic device 300 configured to provide above-mentioned functions may include a flexible display 310, a motor module 330, a plurality of sensors 350, and a processor 370. However, the components of the electronic devices 300 are not limited thereto. In various embodiments, the electronic device 300 may exclude one of the components described above or may include at least one of other components. For example, the electronic device 300 may further include a power management integrated circuit (PMIC).

According to an embodiment, the flexible display 310 may be changed from the first state to the second state or from the second state to the first state according to a driving state of the motor module 330. For example, the flexible display 310 may be changed from the first state in which only a first area of the flexible display is exposed to the outside of the electronic device 300 to the second state in which at least a part of a second area extending from the first area is exposed to the outside of the electronic device 300 together with the first area according to a first activation state of the motor module 330, in which the motor module rotates in a first rotation direction (e.g., the first rotation direction T1 in FIG. 2B). In another example, the flexible display 310 may be changed from the second state in which the first area is exposed to the outside of the electronic device 300 together with at least a part of the second area to the first state in which at least a part of the second area exposed to the outside of the electronic device 300 is drawn into the electronic device 300 according to a second activation state of the motor module 330, in which the motor module rotates in a second rotation direction (e.g., the second rotation direction T2 in FIG. 2B).

According to an embodiment, the motor module 330 may move at least partial area of the flexible display 310 according to a driving state in the first state and the second state. For example, the motor module 330 may push at least a part of second area extending from the first area in a direction corresponding to the first rotation direction T1 according to the first activation state of rotating in the first rotation direction T1 in the first state in which only the first area of the flexible display 310 is exposed to the outside of the electronic device 300. In another example, the motor module 330 may pull at least a part of the second area exposed to the outside of the electronic device 300 in a direction corresponding to the second rotation direction T2 according to the second activation state of rotating in the second rotation direction T2 in the second state in which the first area is exposed to the outside of the electronic device 300 together with at least a part of the second area.

According to an embodiment, the load of the motor module 330 may be increased according to an external factor or an internal factor in the first activation state of rotating in the first rotation direction T1. For example, the torque of the motor module 330 may be increased by an object (e.g., a hand of a user) adjacent to an end of the first area moved by the pushed second area when pushing the second area of the flexible display 310 to the outside of the electronic device 300 according to the first activation state. In another example, the torque of the motor module 330 may be increased by an abnormal state (e.g., jamming of foreign substances or inflow of foreign substances) of a structure (e.g., joint structure of the plurality of joint structures 261 or a gear module in FIGS. 2A and 2B) related to the operation of the motor module 330 or a surface of the motor module 330 when pushing the second area of the flexible display 310 to the outside of the electronic device 300 according to the first activation state.

According to an embodiment, the motor module 330 may be operated in the first activation state for a predetermined time to change the electronic device from the first state to the second state. For example, the motor module 330 may require a predetermined time (e.g., three seconds) to expose all of the portions which can be exposed to the outside of the electronic device among the second area to the outside of the electronic device 300 together with the first area in the first state in which only the first area of the flexible display 310 is exposed to the outside of the electronic device 300.

According to an embodiment, the plurality of sensors 350 may sense an external object adjacent to the electronic device 300. For example, when one of the plurality of sensors 350 is a grip sensor, the grip sensor may sense a gripping force of a user gripping the electronic device 300. In another example, when one of the plurality of sensors 350 is a pressure sensor, the pressure sensor may sense the pressure applied to a side surface (e.g., an end of the first area) of the flexible display 310. In an embodiment, at least one of the plurality of sensors 350 may be disposed in a partial area in a direction corresponding to the moving direction of the second area when being changed from the first state to the second state among the first area of the flexible display 310. According to an embodiment, at least one of the plurality of sensors 350 may be disposed at an edge of a housing (e.g., the second housing 112 in FIGS. 1A and 1B) coupled to the first area of the flexible display 310. In various embodiments, the plurality of sensors 350 may include a plurality of sensors among a grip sensor, a pressure sensor, a proximity sensor, a location detection sensor, a vision sensor, an infrared (IR) sensor, a time of flight (ToF) sensor, and an ultra-wideband (UWB) sensor.

According to an embodiment, the processor 370 may control the motor module 330 such that an area exposed to the outside of the electronic device 300 among the display area of the flexible display 310 is changed based on a characteristic value related to the torque of the motor module 330. For example, the processor 370 may determine the first activation state, the second activation state, or a non-activation state of the motor module 330 according to a torque-characteristic level of the motor module 330 when being changed from the first state to the second state.

According to an embodiment, the processor 370 may determine a plurality of configuration ranges based on the torque of the motor module 330. For example, the processor 370 may divide the plurality of configuration ranges into first to third configuration ranges according to the torque-characteristic level. The first configuration range may mean a torque-characteristic level required for the torque of the motor module 330 to be changed from the first state to the second state when being changed from the first state to the second state. The second configuration range may mean a torque-characteristic level higher than the torque-characteristic level required for the torque of the motor module 330 to be changed from the first state to the second state when being changed from the first state to the second state. The third configuration range may mean a torque-characteristic level higher than the torque-characteristic level in which the torque of the motor module 330 corresponds to the second configuration range when being changed from the first state to the second state.

According to an embodiment, the processor 370 may control the motor module 330 to be maintained in the first activation state until being changed from the first state to the second state when the identified torque of the motor module 330 is included in the first configuration range when being changed from the first state to the second state. For example, the processor 370 may identify the torque-characteristic level of the motor module 330 during a predetermined period of being changed from the first state to the second state, and when the identified torque-characteristic level is continuously included in the first configuration ranged during the predetermined period, may control the motor module 330 to be maintained in the first activation state.

According to an embodiment, the processor 370 may control the motor module 330 to be changed from the first activation state to the non-activation state while being changed from the first state to the second state when the identified torque of the motor module 330 is included in the second configuration range when being changed from the first state to the second state. For example, the processor 370 may identify the torque-characteristic level of the motor module 330 during a predetermined period of being changed from the first state to the second state, and when the identified torque-characteristic level is included in the second configuration range in at least one time point in the predetermined period, may control the motor module 330 to be changed from the first activation state to the non-activation state.

According to an embodiment, the processor 370 may additionally control the operation of the motor module 330 after changing the motor module 330 from the first activation state to the non-activation state as the identified torque of the motor module 330 is included in the second configuration ranged while being changed from the first state to the second state. For example, the processor 370 may identify at least one of the length of a partial area exposed to the outside of the electronic device 300 and the time taken to expose the partial area by using a sensor (e.g., the sensor 250 in FIGS. 2A and 2B) so as to additionally control the operation of the motor module 330 after changing the motor module 330 from the first activation state to the non-activation state. For example, when the length of a partial area exposed to the outside of the electronic device 300 is shorter than a predetermined length (e.g., 30% of the length of 1 frame) in the second state in which a partial area of the second area of the flexible display 310 is exposed to the outside of the electronic device 300, the processor 370 may control the motor module 330 to be changed to the second activation state until being changed from the second state to the first state. In another example, when the operation time of the motor module 330 is shorter than a predetermined time (e.g., 30% of 1 frame open time) in the second state in which a partial area of the second area of the flexible display 310 is exposed to the outside of the electronic device 300, the processor 370 may control the motor module 330 to be changed to the second activation state until being changed from the second state to the first state.

According to an embodiment, when the identified torque of the motor module 330 is included in a third configuration range when being changed from the first state to the second state, the processor 370 may control the motor module 330 to be changed from the first activation state to the second activation state while being changed from the first state to the second state. For example, the processor 370 may identify the torque-characteristic level of the motor module 330 during a predetermined period of being changed from the first state to the second state, and when the identified torque-characteristic level is included in the third configuration range in at least one time point in the predetermined period, may control the motor module 330 to be changed from the first activation state to the second activation state.

According to an embodiment, the processor 370 may control the motor module 330 based on a characteristic value including the length of a partial area exposed to the outside of the electronic device 300 and the operation time of the motor module 330 in the second state in which a partial area of the second area of the flexible display 310 is exposed to the outside of the electronic device 300. For example, when the length of a partial area exposed to the outside of the electronic device 300 among the second area does not correspond to a predetermined length (e.g., 5 cm) during the time (e.g., 3 seconds) for which the motor module 330 is driven until being changed from the first state to the second state, the processor 370 may determine that the identified characteristic value and a reference value are out of an error range so as to control the motor module 330 to be changed from the first activation state to the second activation state.

According to an embodiment, the processor 370 may control the motor module 330 based on an external force identified by using at least one of the plurality of sensors 350. For example, when the external force is identified by using at least one of the plurality of sensors 350 when being changed from the first state to the second state, the processor 370 may control the motor module 330 from the first activation state to the second activation state based on the number of times of occurrence of the identified external force. In various embodiments, the processor 370 may use the identified external force as a reference value for identifying the characteristic value related to the motor module 330 described above.

According to an embodiment, the processor 370 may change the plurality of configuration ranges described above based on a type of an event related to execution of a predetermined application in the first state. For example, when the processor 370 identifies a type of an event (e.g., a game execution event) capable of displaying a first execution screen (e.g., a game screen) of a first application when both the first area and the second area of the flexible display 310 are exposed to the outside of the electronic device 300, the processor may determine the range including the initial first configuration range and the initial second configuration range as a new first configuration range. In this case, the initial third configuration range may maintain to be the same initial third configuration range or may be changed from the initial third configuration range to the new second configuration range. In another example, when the processor 370 identifies a type of an event (e.g., a message reception notification) capable of displaying a second execution screen (e.g., a message screen) of a second application when only a part of the second area is exposed to the outside of the electronic device 300 together with the first area of the flexible display 310, the processor may maintain the initial first configuration range, the initial second configuration range, and the initial third configuration range as they are. Therefore, the processor 370 may change the plurality of configuration ranges described above so as to determine the operation condition of the motor module 330.

According to various embodiments, the processor 370 may set a default value to be automatically changed from the first state to the second state according to the type of an event related to the execution of the predetermined application. For example, when the processor 370 identifies a type of an event capable of displaying the first execution screen of the first application when both the first area and the second area of the flexible display 310 are exposed to the outside of the electronic device 300, the processor may control the motor module 330 to be automatically changed from the first state to the second state according to the set default value.

Figure 4A:
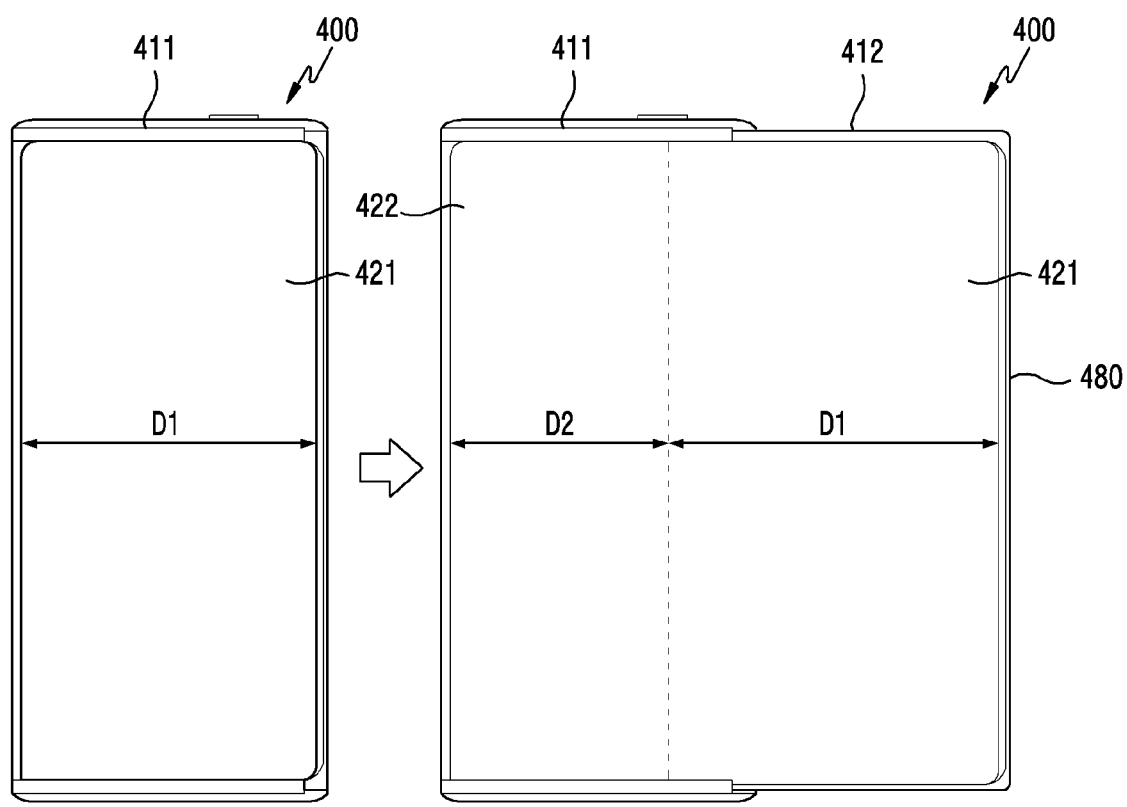
FIG. 4A is a view illustrating a front surface of an electronic device changed from a first state to a second state according to an embodiment of the disclosure.

FIG. 4A is a view illustrating a front surface of an electronic device changed from a first state to a second state according to an embodiment of the disclosure.

Figure 4B:
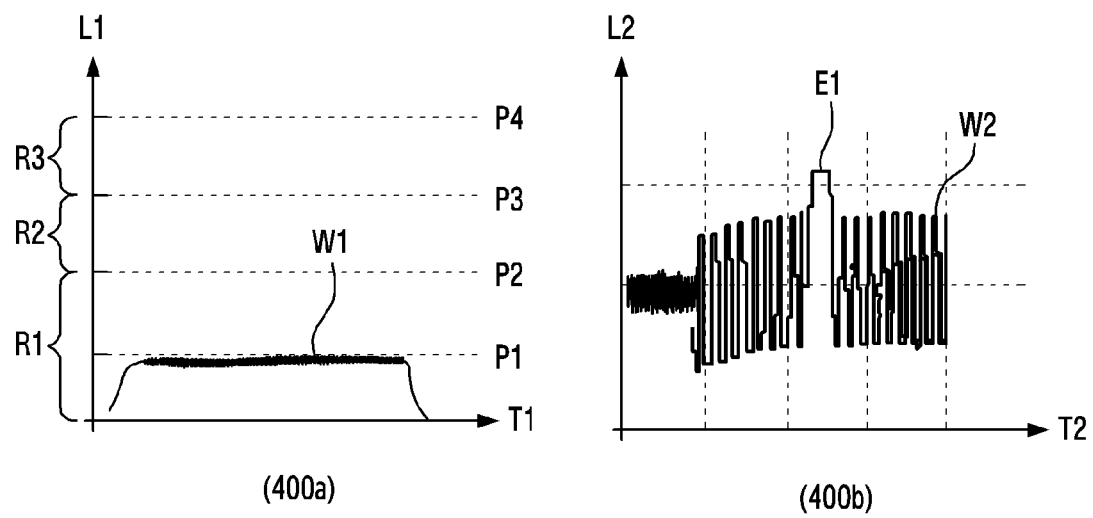
FIG. 4B is a graph showing signals related to an external force detected by a sensor and a characteristic value of a motor when being changed from a first state to a second state in the embodiment of the FIG. 4A according to an embodiment of the disclosure.

FIG. 4B is a graph showing signals related to an external force detected by a sensor and a characteristic value of a motor when being changed from a first state to a second state in the embodiment of the FIG. 4A according to an embodiment of the disclosure. The description related to FIGS. 4A and 4B may refer to the components in FIGS. 1A, 1B, 2A, 2B, and 3 described above.

Referring to FIGS. 4A and 4B, an electronic device 400 may control the motor module 330 based on an external force detected by the sensor 250 and a characteristic value related to motor module 330.

According to an embodiment, in a state in which the electronic device 400 is in the first state, only a first area 421 of the flexible display 310 may be exposed to the outside of the electronic device 400. In the first state, a second housing 412 may overlap one surface (e.g., a front surface) of a first housing 411. The flexible display 310 may have a display area having a first length D1 corresponding to the first area 421 in the first state.

According to an embodiment, as the electronic device 400 is changed from the first state to the second state, most area of a second area 422 may be exposed to the outside of the electronic device 400 together with the first area 421 of the flexible display 310. In the second state, the second housing 412 may be moved from a position deviated from the first housing 411 in a direction (e.g., an expansion direction) parallel to each other. The flexible display 310 may have a display area including the first length D1 corresponding to the first area 421 and a second length D2 corresponding to most area of the second area 422 in the second state. According to various embodiments, the electronic device 400 may identify an external force by using a sensor 480 disposed on a side surface of the first area 421 (or the second housing 412) while being changed from the first state to the second state.

According to an embodiment, the electronic device 400 may identify, when being changed from the first state to the second state as described above, that a first waveform W1 showing a torque-characteristic level of the motor module is included in a first configuration range R1 of a plurality of configuration ranges R1 to R3 as in an example of a first graph 400a. The first configuration range R1 may indicate a range including a first threshold value P1 and a second threshold value P2 from a value of 0 in which the driving state of the motor module 330 is substantially inactive. A second configuration range R2 may indicate a range including a third threshold value P3 from the second threshold value P2. A third configuration range R3 may indicate a range including a fourth threshold value P4 from the third threshold value P3.

According to an embodiment, the electronic device 400 may identify, when being changed from the first state to the second state as described above, a first size external force E1 in a second waveform W2 indicating a sensing level of an external force by an external object as in an example of a second graph 400b. According to an embodiment, when the torque-characteristic level of the motor module 330 is continuously included in the first configuration range R1 for a predetermined period even if the first size external force E1 is identified, the electronic device 400 may control to ignore the identified first size external force E1 and maintain the motor module 330 in the first activation state.

Figure 5A:
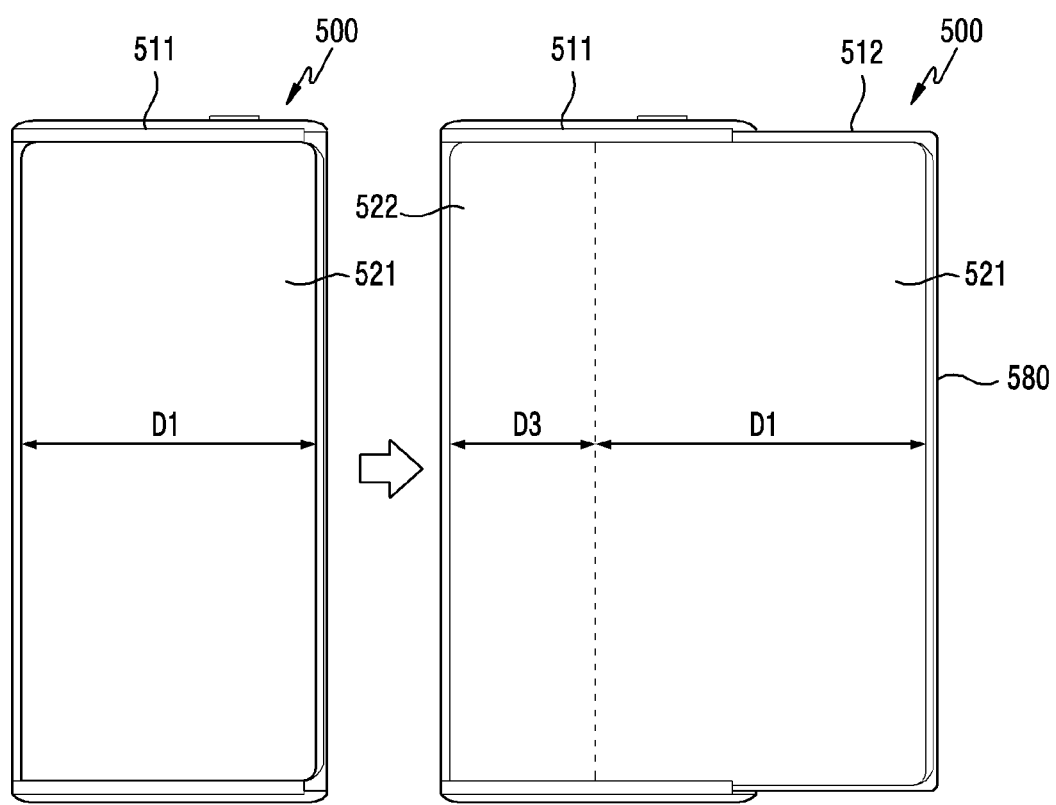
FIG. 5A is a view illustrating a front surface of an electronic device changed from a first state to a second state according to an embodiment of the disclosure.

FIG. 5A is a view illustrating a front surface of an electronic device changed from a first state to a second state according to an embodiment of the disclosure.

Figure 5B:
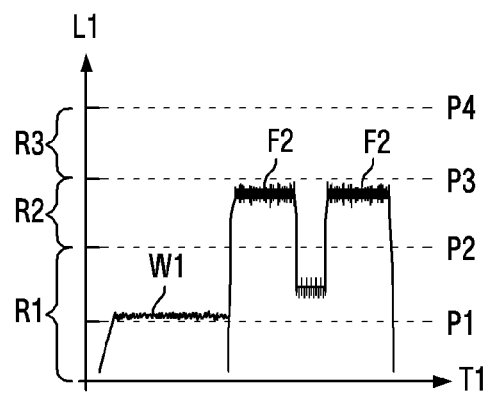
FIG. 5B is a graph showing signals related to an external force detected by a sensor and a characteristic value of a motor when being changed from a first state to a second state in the embodiment of the FIG. 5A according to an embodiment of the disclosure.
Figure 5B:
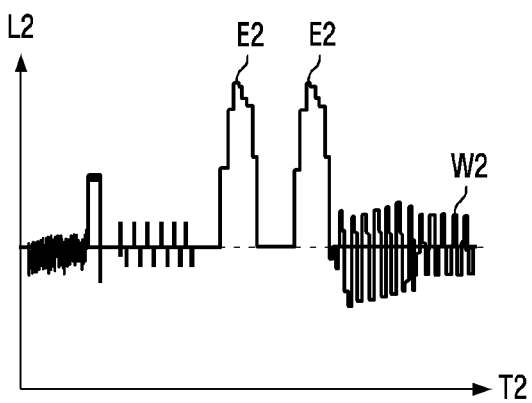

FIG. 5B is a graph showing signals related to an external force detected by a sensor and a characteristic value of a motor when being changed from a first state to a second state in the embodiment of the FIG. 5A according to an embodiment of the disclosure. The description related to FIGS. 5A and 5B may refer to the components in FIGS. 1A, 1B, 2A, 2B, and 3 described above.

Referring to FIGS. 5A and 5B, in a state in which an electronic device 500 is in the first state, only a first area 521 of the flexible display 310 may be exposed to the outside of the electronic device 500. In the first state, a second housing 512 may overlap one surface (e.g., a front surface) of a first housing 511. The flexible display 310 may have a display area having a first length D1 corresponding to the first area 521 in the first state.

According to an embodiment, as the electronic device 500 is changed from the first state to the second state, a partial area of a second area 522 may be exposed to the outside of the electronic device 500 together with the first area 521 of the flexible display 310. In the second state, the second housing 512 may be moved from a position deviated from the first housing 511 in a direction (e.g., an expansion direction) parallel to each other. The flexible display 310 may have a display area including a first length D1 corresponding to the first area 521 and a third length D3 corresponding to a partial area of the second area 522 in the second state. According to various embodiments, the electronic device 500 may identify an external force by using a sensor 580 disposed on a side surface of the first area 521 (or the second housing 512) while being changed from the first state to the second state. The second state in FIG. 5A may be a partially expanded state in which a partial area of the second area 522 of the flexible display 310 is expanded.

According to an embodiment, when being changed from the first state to the second state as described above, as in an example of a first graph 500a, the electronic device 500 may identify that a part F2 of the first waveform W1 indicating the torque-characteristic level of the motor module 330 is included in a second configuration range R2 of the plurality of configuration ranges R1 to R3. In an embodiment, when the identified torque of the motor module is included in the second configuration range R2 when being changed from the first state to the second state, the electronic device 500 may control the motor module 330 to be changed from the first activation state to the non-activation state while being changed from the first state to the second state. For example, the electronic device 500 may identify the torque-characteristic level of the motor module 330 during a predetermined period of being changed from the first state to the second state, and when the identified torque-characteristic level is included in the second configuration range R2 in at least one time point in the predetermined period, may control the motor module 330 to be changed from the first activation state to the non-activation state.

According to an embodiment, when being changed from the first state to the second state as described above, as in an example of a second graph 500b, the electronic device 500 may identify a second size external force E2 in the second waveform W2 indicating the sensing level of an external force by an external object. According to an embodiment, the electronic device 500 may control the motor module 330 to be changed from the first activation state to the non-activation state based on the number of times (e.g., two or more times) of identifying the second size external force E2.

Figure 5C:
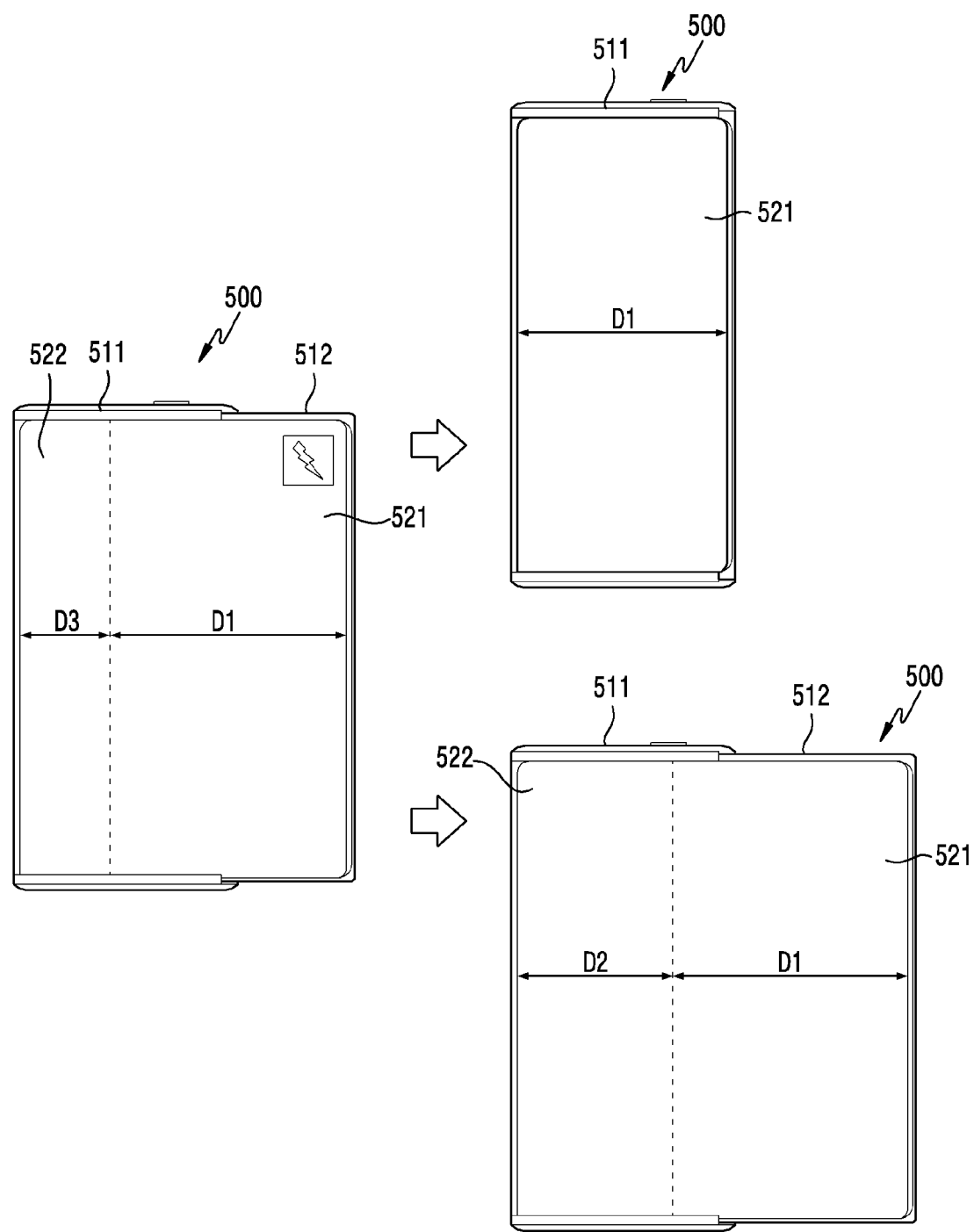
FIG. 5C is a view illustrating a successive reduction or expansion state of a display area of an electronic device in a second state according to an embodiment of the disclosure.

FIG. 5C is a view illustrating a successive reduction or expansion state of a display area of an electronic device in a second state according to an embodiment of the disclosure. The description related to FIG. 5C may refer to the components in FIGS. 1A, 1B, 2A, 2B, and 3 described above.

Referring to FIG. 5C, in the electronic device 500, a partial area of the second area 522 may be exposed to the outside of the electronic device 500 together with the first area 521 of the flexible display 310 based on at least one of the external force detected by a sensor (e.g., the sensor 580 in FIG. 5A) and a characteristic value related to the motor module 330. The flexible display 310 may have a display area including a first length D1 corresponding to the first area 521 and the third length D3 corresponding to a partial area of the second area 522 in the second state.

According to an embodiment, the electronic device 500 may determine whether to be changed to the first state or the second state based on at least one of a length of a partial area of the second area 522 and a time taken to expose a partial area of the second area 522 in the state in which a partial area of the second area 522 is exposed to the outside of the electronic device 500 together with the first area 521 of the flexible display 310.

In an embodiment, the electronic device 500 may be changed from the second state in which a partial area of the second area 522 is exposed to the outside of the electronic device 500 to the first state when a length (e.g., the third length D3) of a partial area of the second area is shorter than a predetermined length (e.g., 30% of the length of 1 frame) in the second state in which a partial area of the second area 522 of the flexible display 310 is exposed to the outside of the electronic device 500. In this case, the electronic device 500 may change the motor module 330 to the second activation state until being changed from the second state to the first state. In an embodiment, the electronic device 500 may be maintained in the second state in which a partial area of the second area 522 is exposed to the outside of the electronic device 500 or may be changed from the second state to the first state when the length (e.g., the third length D3) of a partial area of the second area 522 is equal to or longer than a predetermined length (e.g., 30% of the length of 1 frame) in the second state in which a partial area of the second area 522 of the flexible display 310 is exposed to the outside of the electronic device 500. In this case, the electronic device 500 may control the motor module 330 to be in the non-activation state to be maintained in the second state or may control the motor module 330 to be changed from the non-activation state to the second activation state until being changed from the second state to the second state in which most area of the second area 522 is exposed to the outside of the electronic device 500.

In an embodiment, the electronic device 500 may be changed from the second state in which a partial area of the second area 522 is exposed to the outside of the electronic device 500 to the first state when the operation time of the motor module 330 is shorter than a predetermined time (e.g., 30% of 1 frame open time) in the second state in which a partial area of the second area 522 of the flexible display 310 is exposed to the outside of the electronic device 500. In this case, the electronic device 500 may change the motor module 330 to the second activation state until being changed from the second state to the first state. In an embodiment, the electronic device 500 may be maintained in the second state in which a partial area of the second area 522 is exposed to the outside of the electronic device 500 or may be changed from the second state to the first state when the operation time of the motor module 330 is equal to or longer than a predetermined time (e.g., 30% of 1 frame open time) in the second state in which a partial area of the second area 522 of the flexible display 310 is exposed to the outside of the electronic device 500. In this case, the electronic device 500 may control the motor module 330 to be in the non-activation state to be maintained in the second state or may control the motor module 330 to be changed from the non-activation state to the second activation state until being changed from the second state to the second state in which most area of the second area 522 is exposed to the outside of the electronic device 500.

Figure 6A:
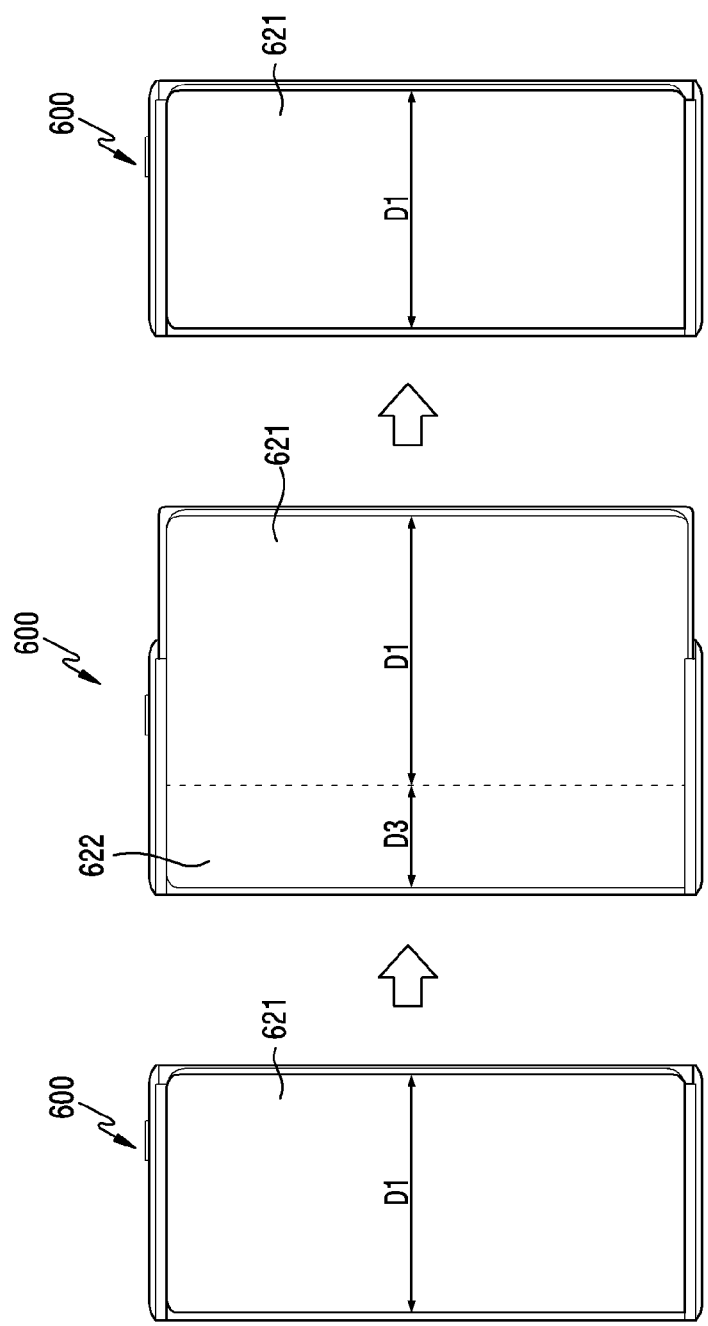
FIG. 6A is a view illustrating a front surface of an electronic device changed from a second state to a first state while being changed from a first state to a second state according to an embodiment of the disclosure.

FIG. 6A is a view illustrating a front surface of an electronic device changed from a second state to a first state while being changed from a first state to a second state according to an embodiment of the disclosure.

Figure 6B:
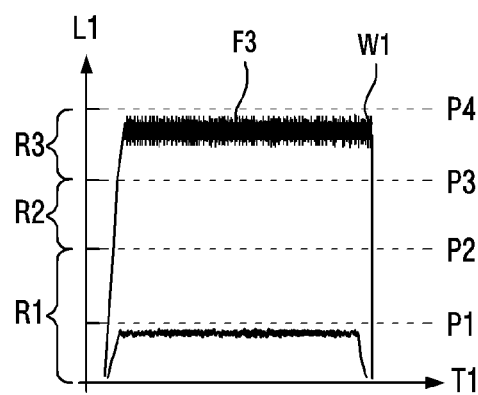
FIG. 6B is a graph showing signals related to an external force detected by a sensor and a characteristic value of a motor when being changed from a first state to a second state in the embodiment of the FIG. 6A according to an embodiment of the disclosure.

FIG. 6B is a graph showing signals related to an external force detected by a sensor and a characteristic value of a motor when being changed from a first state to a second state in the embodiment of the FIG. 6A according to an embodiment of the disclosure. The description related to FIGS. 6A and 6B may refer to the components in FIGS. 1A, 1B, 2A, 2B, and 3 described above.

Referring to FIGS. 6A and 6B, in a state in which an electronic device 600 is in the first state, only a first area 621 of the flexible display 310 may be exposed to the outside of the electronic device 600. The flexible display 310 may have a display area having a first length D1 corresponding to the first area 621 in the first state.

According to an embodiment, as the electronic device 600 is changed from the first state to the second state, a partial area of the second area 522 may be exposed to the outside of the electronic device 600 together with the first area 621 of the flexible display 310. The flexible display 310 may have a display area including the first length D1 corresponding to the first area 621 and a third length D3 corresponding to a partial area of a second area 622 in the second state.

According to an embodiment, the electronic device 600 may be changed from the second state to the first state based on a characteristic value related to the motor module 330 in the second state in which a partial area of the second area 522 is exposed to the outside of the electronic device 600 together with the first area 621 of the flexible display 310. For example, the electronic device 600 may be changed from the second state to the first state when the torque-characteristic level of the motor module 330 is included in a predetermined configuration range in at least one time point in a predetermined period in the second state in which a partial area of the second area 522 is exposed to the outside of the electronic device 600 together with the first area 621 of the flexible display 310.

According to an embodiment, when being changed from the first state to the second state as described above, as in an example of a graph 600a, the electronic device 600 may identify that a part F3 of the first waveform W1 showing the torque-characteristic level of the motor module 330 is included in the third configuration range R3 of the plurality of configuration ranges R1 to R3. In an embodiment, when the identified torque of the motor module 330 is included in the third configuration range R3 when being changed from the first state to the second state, the electronic device 600 may control the motor module 330 to be changed from the first activation state to the second activation state while being changed from the first state to the second state. For example, the electronic device 600 may identify the torque-characteristic level of the motor module 330 during a predetermined period of being changed from the first state to the second state, and when the identified torque-characteristic level is included in the third configuration range R3 in at least one time point in the predetermined period, may control the motor module 330 to be changed from the first activation state to the second activation state.

Figure 7:
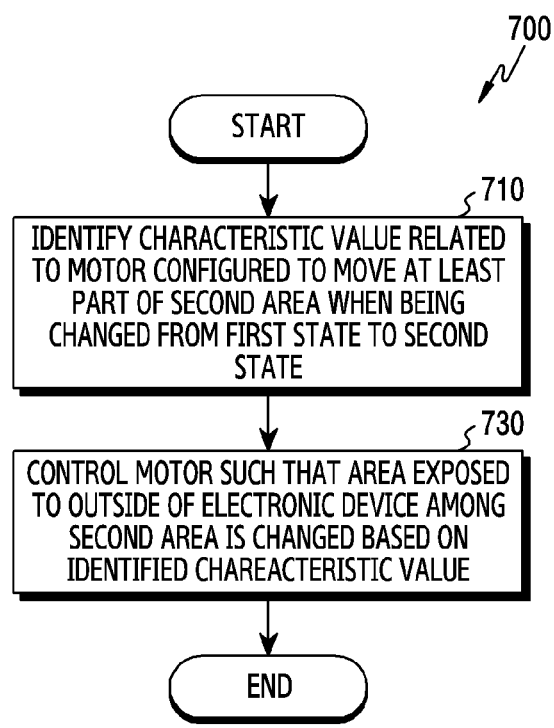
FIG. 7 is a view illustrating a control method for a flexible display according to an embodiment of the disclosure.

FIG. 7 is a view illustrating a control method for a flexible display according to an embodiment of the disclosure. The description related to FIG. 7 may refer to the components in FIGS. 1A, 1B, 2A, 2B, and 3 described above.

Referring to FIG. 7, in a control method 700 the electronic device 300 may perform operation 710 and operation 730 to determine one of the first state and a detailed state (e.g., a partial expansion of a display area and an entire expansion of a display area) related to the second state according to an external factor (e.g., contact with an object or access of an object) and/or an internal factor (e.g., overload of a motor) when being changed from the first state to the second state.

Referring to operation 710, the processor 370 may identify a characteristic value related to the motor module 330 configured to move at least a part of the second area extending from the first area of the flexible display 310 when being changed from the first state to the second state. The characteristic value related to the motor module 330 may include at least one of the torque of the motor module 330 and the operation time of the motor module 330.

In an embodiment, the processor 370 may determine the plurality of configuration ranges based on the torque of the motor module 330. For example, the processor 370 may divide the plurality of configuration ranges into the first to third configuration ranges according to the torque-characteristic level. The first configuration range may mean the torque-characteristic level required for the torque of the motor module 330 to be changed from the first state to the second state when being changed from the first state to the second state. The second configuration range may mean the torque-characteristic level higher than the torque-characteristic level required for the torque of the motor module 330 to be changed from the first state to the second state when being changed from the first state to the second state. The third configuration range may mean the torque-characteristic level higher than the torque-characteristic level in which the torque of the motor module 330 corresponds to the second configuration range when being changed from the first state to the second state.

Referring to operation 730, the processor 370 may control the motor module 330 such that an area exposed to the outside of the electronic device 300 among a display area of the flexible display 310 is changed based on a characteristic value identified in the operation 710. For example, the processor 370 may determine the first activation state, the second activation state, or the non-activation state of the motor module 330 according to the torque-characteristic level of the motor module 330 when being changed from the first state to the second state.

In an embodiment, the processor 370 may control the motor module 330 to be maintained in the first activation state until being changed from the first state to the second state when the identified torque of the motor module 330 is included in the first configuration range when being changed from the first state to the second state. For example, the processor 370 may identify the torque-characteristic level of the motor module 330 during a predetermined period of being changed from the first state to the second state, and when the identified torque-characteristic level is continuously included in the first configuration ranged during the predetermined period, may control the motor module 390 to be maintained in the first activation state.

In an embodiment, the processor 370 may control the motor module 330 to be changed from the first activation state to the non-activation state while being changed from the first state to the second state when the identified torque of the motor module 330 is included in the second configuration range when being changed from the first state to the second state. For example, the processor 370 may identify the torque-characteristic level of the motor module 330 during a predetermined period of being changed from the first state to the second state, and when the identified torque-characteristic level is included in the second configuration range in at least one time point in the predetermined period, may control the motor module 330 to be changed from the first activation state to the non-activation state.

In an embodiment, the processor 370 may additionally control the operation of the motor module 330 after changing the motor module 330 from the first activation state to the non-activation state as the identified torque of the motor module 330 is included in the second configuration ranged while being changed from the first state to the second state. For example, the processor 370 may identify at least one of the length of a partial area exposed to the outside of the electronic device 300 and the time taken to expose the partial area by using the sensor 250 so as to additionally control the operation of the motor module 330 after changing the motor module 330 from the first activation state to the non-activation state. For example, when the length of a partial area exposed to the outside of the electronic device 300 is shorter than a predetermined length (e.g., 30% of the length of 1 frame) in the second state in which a partial area of the second area of the flexible display 310 is exposed to the outside of the electronic device 300, the processor 370 may control the motor module 330 to be changed to the second activation state until being changed from the second state to the first state. In another example, when the operation time of the motor module 330 is shorter than a predetermined time (e.g., 30% of 1 frame open time) in the second state in which a partial area of the second area of the flexible display 310 is exposed to the outside of the electronic device 300, the processor 370 may control the motor module 330 to be changed to the second activation state until being changed from the second state to the first state.

In an embodiment, when the identified torque of the motor module 330 is included in the third configuration range when being changed from the first state to the second state, the processor 370 may control the motor module 330 to be changed from the first activation state to the second activation state while being changed from the first state to the second state. For example, the processor 370 may identify the torque-characteristic level of the motor module 330 during a predetermined period of being changed from the first state to the second state, and when the identified torque-characteristic level is included in the third configuration range in at least one time point in the predetermined period, may control the motor module 330 to be changed from the first activation state to the second activation state.

In an embodiment, the processor 370 may control the motor module 330 based on a characteristic value including the length of a partial area exposed to the outside of the electronic device 300 and the operation time of the motor module 330 in the second state in which a partial area of the second area of the flexible display 310 is exposed to the outside of the electronic device 300. For example, when the length of a partial area exposed to the outside of the electronic device 300 among the second area does not correspond to a predetermined length (e.g., 5 cm) during the time (e.g., 3 seconds) for which the motor module 330 is driven until being changed from the first state to the second state, the processor 370 may determine that the identified characteristic value and a reference value are out of an error range so as to control the motor module 330 to be changed from the first activation state to the second activation state.

According to an embodiment, the processor 370 may control the motor module 330 based on an external force identified by using at least one of the plurality of sensors 350. For example, when the external force is identified by using at least one of the plurality of sensors 350 when being changed from the first state to the second state, the processor 370 may control the motor module 330 from the first activation state to the second activation state based on the number of times of occurrence of the identified external force. In various embodiments, the processor 370 may use the identified external force as a reference value for identifying the characteristic value related to the motor module 330 described above.

Figure 8:
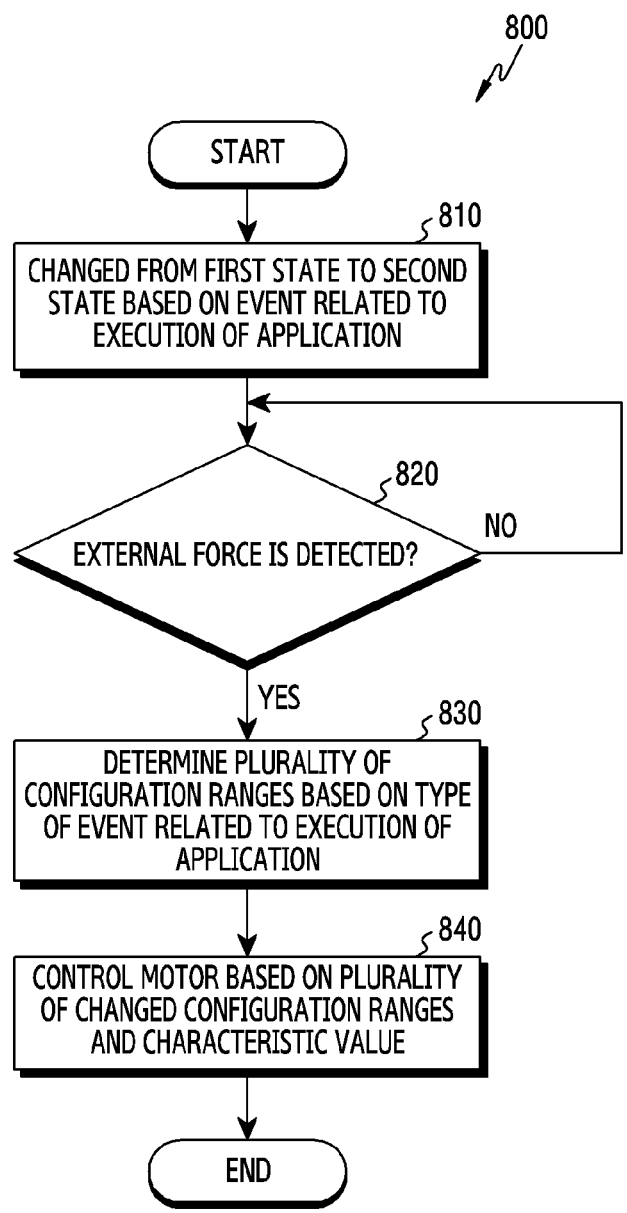
FIG. 8 is a view illustrating a control method for a flexible display according to an embodiment of the disclosure.

FIG. 8 is a view illustrating a control method for a flexible display according to an embodiment of the disclosure. The description related to FIG. 8 may refer to the components in FIGS. 1A, 1B, 2A, 2B, and 3 described above.

Referring to FIG. 8, in a control method 800 the electronic device 300 may perform operation 810 and operation 840 to determine one of the first state and a detailed state (e.g., a partial expansion of a display area and an entire expansion of a display area) related to the second state according to an external factor (e.g., contact with an object or access of an object) and/or an internal factor (e.g., overload of a motor) when being changed from the first state to the second state.

Referring to operation 810, the processor 370 may be changed from the first state to the second state based on an event related to the execution of a predetermined application. For example, the processor 370 may control the motor module 330 such that most area of the second area extending from the first area of the flexible display 310 is exposed to the outside of the electronic device 300 when the event for executing a game is identified. In another example, the processor 370 may control the motor module 330 such that a part of the second area extending from the first area of the flexible display 310 is exposed to the outside of the electronic device 300 when the event for displaying a message is identified.

Referring to operation 820, the processor 370 may identify an external force by using at least one of the plurality of sensors 350. The identified external force may include at least one of contact with an object, access of an object, or overload of the motor module 330. In operation 820, the processor 370 may perform operation 830 when the external force is identified.

Referring to operation 830, the processor 370 may determine a plurality of configuration ranges (e.g., the plurality of configuration ranges R1, R2, and R3 in FIG. 4B) based on a type of an event identified in the operation 810. For example, the processor 370 may set a range including the first configuration range R1 and the second configuration range R2 as a new first configuration range when the type of an event capable of displaying the execution display of a game is identified when both the first area and the second area of the flexible display 310 are exposed to the outside of the electronic device 300. In this case, the processor 370 may change the initial third configuration range R3 to a new second configuration range. In another example, when the processor 370 identifies a type of an event capable of displaying a message screen when only a part of the second area is exposed to the outside of the electronic device 300 together with the first area of the flexible display 310, the processor may maintain the first configuration range, the second configuration range, and the third configuration range as they are. Therefore, the processor 370 may change the plurality of configuration ranges R1, R2, and R3 described above so as to determine the operation condition of the motor module 330.

Referring to operation 840, the processor 370 may control the motor module 330 based on the characteristic value related to the motor module and the plurality of changed configuration ranges. For example, when the processor 370 sets a new first configuration range including the first configuration range R1 and the second configuration range R2 as the event related to the execution of a game is identified, the processor may continuously operate the motor module 330 to be changed from the first state to the second state while the torque-characteristic level of the motor module 330 is included in the new first configuration range.

Figure 9:
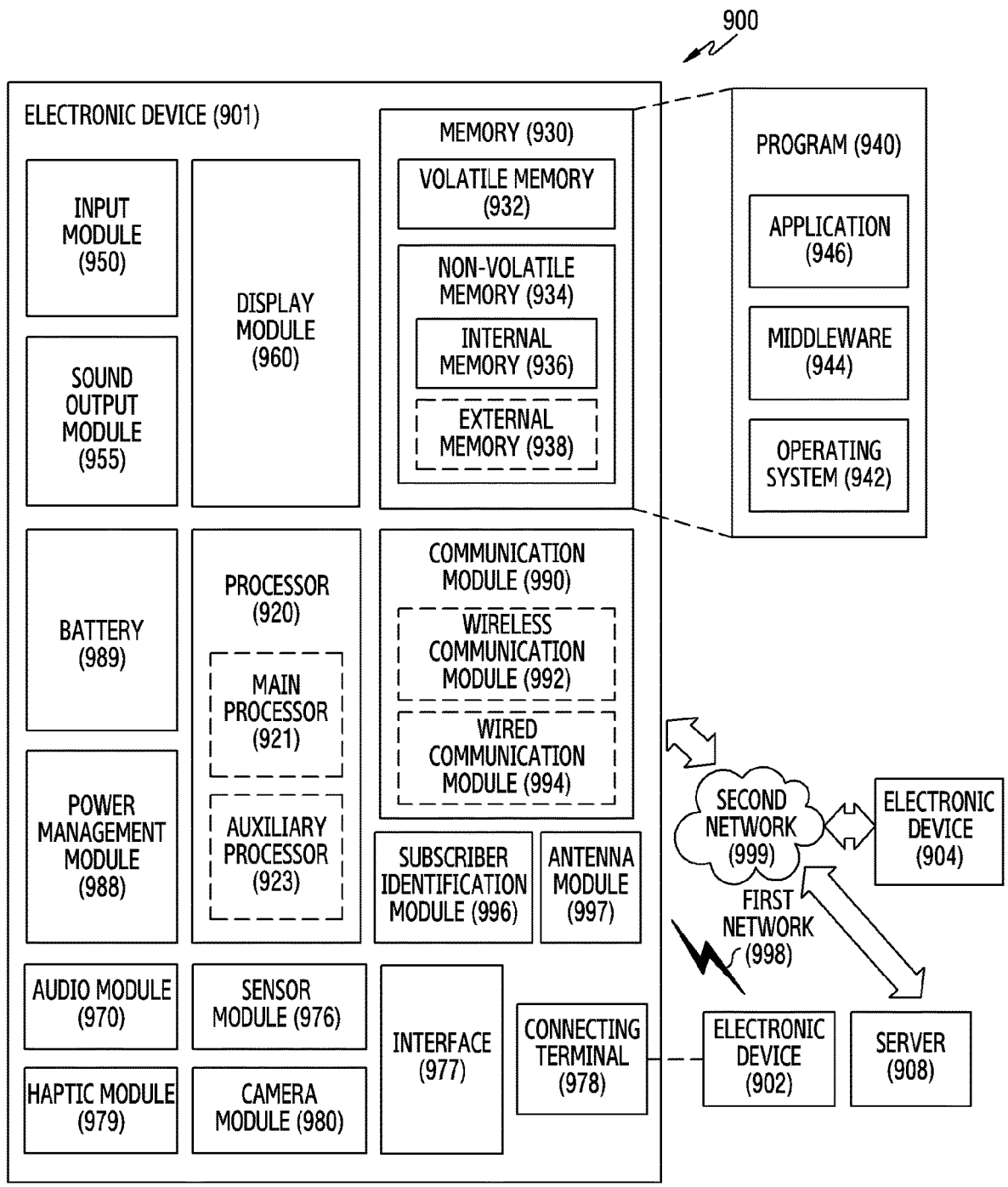
FIG. 9 is a block diagram of an electronic device in a network environment according to an embodiment of the disclosure.

FIG. 9 is a block diagram illustrating an electronic device in a network environment according to an embodiment of the disclosure.

Referring to FIG. 9, an electronic device 901 in a network environment 900 may communicate with an external electronic device 902 via a first network 998 (e.g., a short-range wireless communication network), or at least one of an external electronic device 904 or a server 908 via a second network 999 (e.g., a long-range wireless communication network). According to an embodiment, the electronic device 901 may communicate with the external electronic device 904 via the server 908. According to an embodiment, the electronic device 901 may include a processor 920, a memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., the external electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the external electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

The connecting terminal 978 may include a connector via which the electronic device 901 may be physically connected with the external electronic device (e.g., the external electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the external electronic device 902, the external electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5th generation node (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the external electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the external electronic devices 902 or 904 may be a device of a same type as, or a different type, from the electronic device 901. According to an embodiment, all or some of operations to be executed at the electronic device 901 may be executed at one or more of the external electronic devices 902 and 904 or the server 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

According to various embodiments, an electronic device (e.g., the electronic device 300) may include a flexible display (e.g., the flexible display 310) which includes a first area (e.g., the first part 121) and a second area (e.g., the second part 122) extending from the first area and in which the first area is exposed to the outside of the electronic device in a first state (e.g., the first state 100*a*) and at least a part of the second area is exposed to the outside of the electronic device together with the first area in a second state (e.g., the second state 100*b*) different from the first state, a motor module (e.g., the motor module 330) which moves at least a part of the second area according to a driving state in the first state and the second state, and a processor (e.g., the processor 370) electrically connected to the flexible display and the motor module, wherein the processor identifies a characteristic value related to the motor module when being changed from the first state to the second state and controls the motor module such that an area exposed to the outside of the electronic device among the second area is changed based on the identified characteristic value.

According to various embodiments, the processor may be configured to determine a plurality of configuration ranges (e.g., the plurality of configuration ranges R1, R2, and R3) related to the characteristic value based on the torque of the motor module and identify whether the identified characteristic value is included in at least one of the plurality of configuration ranges.

According to various embodiments, the processor may control the motor module to be maintained in a first activation state related to a first rotation direction until being changed from the first state to the second state when the identified characteristic value is included in a first configuration range of the plurality of configuration ranges.

According to various embodiments, the processor may control the motor module to be changed from a first activation state related to a first rotation direction to a non-activation state while being changed from the first state to the second state when the identified characteristic value is included in a second configuration range of the plurality of configuration ranges.

According to various embodiments, the electronic device may include a first sensor (e.g., the sensor 250), wherein the processor identifies at least one of the length of a partial area exposed to the outside of the electronic device among the second area and the time taken to expose the partial area to the outside of the electronic device by using the first sensor when the processor controls the motor module to be changed from the first activation state to the non-activation state while being changed from the first state to the second state, and may control the motor module such that an area exposed to the outside of the electronic device among the second area is changed based on at least one of the identified length of the partial area and the time taken.

According to various embodiments, the processor may control the motor module to be changed from a first activation state related to a first rotation direction to a second activation state related to a second rotation direction opposite to the first rotation direction until being changed from the second state to the first state while being changed from the first state to the second state when the identified characteristic value is included in a third configuration range of the plurality of configuration ranges.

According to various embodiments, the electronic device may include a first sensor, wherein the processor identifies the length of a partial area exposed to the outside of the electronic device among the second area by using the first sensor, identifies the characteristic value based on the identified length of the partial area and the operation time of the motor module, and controls the motor module such that the area exposed to the outside of the electronic device among the second area is changed based on an error range of the identified characteristic value and a reference value.

According to various embodiments, the processor may control the motor module to be changed from a first activation state related to a first rotation direction to a second activation state related to a second rotation direction opposite to the first rotation direction until being changed from the second state to the first state while being changed from the first state to the second state when an error range of the identified characteristic value and the reference value corresponds to the outside of a predetermined error range.

According to various embodiments, the electronic device may include a second sensor (e.g., at least one sensor of the plurality of sensors 350) disposed in a partial area in a direction corresponding to the movement direction of the second area when being changed from the first state to the second state among the first area, wherein the processor identifies external force by using the second sensor when being changed from the first state to the second state and controls the motor module such that an area exposed to the outside of the electronic device among the second area is changed based on at least one of the identified external force and the identified characteristic value.

According to various embodiments, the processor may determine the plurality of configuration ranges based on a type of an event related to the execution of a predetermined application in the first state.

According to various embodiments, a control method for a flexible display may include an operation (e.g., operation 710) of identifying, when being changed from a first state in which a first area of a flexible display is exposed to the outside of an electronic device to a second state in which at least a part of a second area of the flexible display extending from the first area is exposed to the outside of the electronic device together with the first area, a characteristic value related to a motor module configured to move at least a part of the second area, and an operation (e.g., operation 730) of controlling the motor module such that an area exposed to the outside of the electronic device among the second area is changed based on the identified characteristic value.

According to various embodiments, an operation of determining a plurality of configuration ranges related to the characteristic value based on the torque of the motor module and an operation of identifying whether the identified characteristic value is included in at least one of the plurality of configuration ranges may be included.

According to various embodiments an operation of identifying the length of a partial area exposed to the outside of the electronic device among the second area by using a first sensor, an operation of identifying the characteristic value based on the identified length of the partial area and the operation time of the motor module, and an operation of controlling the motor module such that an area exposed to the outside of the electronic device among the second area is changed based on an error range of the identified characteristic value and a reference value may be included.

According to various embodiments, an operation of identifying external force by using a second sensor disposed in a partial area in a direction corresponding to the movement direction of the second area among the first area when being changed from the first state to the second state, and an operation of controlling the motor module such that an area exposed to the outside of the electronic device among the second area is changed based on at least one of the identified external force and the identified characteristic value may be included.

According to various embodiments, an operation of determining the plurality of configuration ranges based on a type of an event related to the execution of an application related to the execution of a predetermined application in the first state may be included.

According to various embodiments, an electronic device may include a flexible display which includes a first area and a second area extending from the first area and in which the first area is exposed to the outside of the electronic device in a first state and at least a part of the second area is exposed to the outside of the electronic device together with the first area in a second state different from the first state, a motor module configured to move at least a part of the second area according to a driving state in the first state and the second state, a plurality of sensors (e.g., the plurality of sensors 350) arranged in a partial area in a direction corresponding to the movement direction of the second area when being changed from the first state to the second state among the first area, and a processor electrically connected to the flexible display, the motor module, and the plurality of sensors, wherein the processor identifies a characteristic value related to the motor module when being changed from the first state to the second state, identifies external force by using one of the plurality of sensors based on whether an input of a user gripping the electronic device is detected when being changed from the first state to the second state, and controls the motor module such that an area exposed to the outside of the electronic device among the second area is changed based on at least one of the identified characteristic value and the identified external force.

According to various embodiments, the processor may identify external force according to the detection of the input of the user by using a grip sensor of the plurality of sensors when the input of the user is detected when being changed from the first state to the second state.

According to various embodiments, the processor may identify external force by using a pressure sensor of the plurality of sensors when the input of the user is not detected when being changed from the first state to the second state.

According to various embodiments, the processor may determine the plurality of configuration ranges related to the characteristic value based on the torque of the motor module and may identify whether the identified characteristic value is included at least one of the plurality of configuration ranges.

According to various embodiments, the processor may determine the plurality of configuration ranges based on a type of an event related to the execution of a predetermined application in the first state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a flexible display comprising a first area and a second area extending from the first area, the first area being exposed to an outside of the electronic device in a first state, at least a part of the second area being exposed to the outside together with the first area in a second state different from the first state;
a motor configured to move the at least the part of the second area according to a driving state in the first state and the second state; and
a processor electrically connected to the flexible display and the motor,
wherein the processor is configured to:
in response to the flexible display changing from the first state to the second state, identify a characteristic value related to the motor, and
based on the characteristic value, control the motor to change an area exposed to the outside among the second area.

2. The electronic device of claim 1, wherein the processor is further configured to:
based on a torque of the motor, determine a plurality of configuration ranges related to the characteristic value, and
identify whether the characteristic value is included in at least one of the plurality of configuration ranges.

3. The electronic device of claim 2, wherein the processor is further configured to:

in response to the characteristic value being included in a first configuration range of the plurality of configuration ranges, control to maintain the motor in a first activation state related to a first rotation direction until being changed from the first state to the second state.

4. The electronic device of claim 2, wherein the processor is further configured to:
in response to the characteristic value being included in a second configuration range of the plurality of configuration ranges, control to change the motor from a first activation state related to a first rotation direction to a non-activation state while being changed from the first state to the second state.

5. The electronic device of claim 4, further comprising:
a first sensor,
wherein the processor is further configured to:
in response to changing the motor from the first activation state to the non-activation state while being changed from the first state to the second state, identify, by using the first sensor, at least one of a length of a partial area exposed to the outside among the second area or an amount of time taken to expose the partial area to the outside, and
based on at least one of the length of the partial area or the amount of time taken to expose the partial area, control the motor to change the partial area exposed to the outside among the second area.

6. The electronic device of claim 2, wherein the processor is further configured to:
in response to the characteristic value being included in a third configuration range of the plurality of configuration ranges, control to change the motor from a first activation state related to a first rotation direction to a second activation state related to a second rotation direction opposite to the first rotation direction until being changed from the second state to the first state while being changed from the first state to the second state.

7. The electronic device of claim 2, wherein the processor is further configured to:
based on a type of an event related to an execution of a predetermined application in the first state, determine the plurality of configuration ranges.

8. The electronic device of claim 1, further comprising:
a first sensor,
wherein the processor is further configured to:
identify, by using the first sensor, a length of a partial area exposed to the outside among the second area,
based on the length of the partial area and an operation time of the motor, identify the characteristic value, and
based on an error range of the characteristic value and a reference value, control the motor to change the partial area exposed to the outside among the second area.

9. The electronic device of claim 8, wherein the processor is further configured to:
in response to the error range of the characteristic value and the reference value being outside of a predetermined error range, control to change the motor from a first activation state related to a first rotation direction to a second activation state related to a second rotation direction opposite to the first rotation direction until being changed from the second state to the first state while being changed from the first state to the second state.

10. The electronic device of claim 1, further comprising:
a second sensor disposed in a partial area in a direction corresponding to a movement direction of the second area among the first area according to a changing from the first state to the second state,
wherein the processor is further configured to:
in response to changing from the first state to the second state, identify an external force by using the second sensor, and
based on at least one of the external force and the characteristic value, control the motor to change the area exposed to the outside among the second area.

11. A method for controlling a flexible display, the method comprising:
in response to the flexible display changing from a first state, in which a first area of the flexible display is exposed to an outside of an electronic device, to a second state in which at least a part of a second area of the flexible display extending from the first area is exposed to the outside together with the first area, identifying a characteristic value related to a motor configured to move the at least the part of the second area; and
based on the characteristic value, controlling the motor to change an area exposed to the outside among the second area.

12. The method of claim 11, further comprising:
based on a torque of the motor, determining a plurality of configuration ranges related to the characteristic value; and
identifying whether the characteristic value is included in at least one of the plurality of configuration ranges.

13. The method of claim 12, further comprising:
determining the plurality of configuration ranges based on a type of an event related to an execution of an application related to an execution of a predetermined application in the first state.

14. The method of claim 11, further comprising:
identifying, by using a first sensor, a length of a partial area exposed to the outside among the second area;
based on the length of the partial area and an operation time of the motor, identifying the characteristic value; and
based on an error range of the characteristic value and a reference value, controlling the motor to change such that the partial area exposed to the outside among the second area.

15. The method of claim 11, further comprising:
identifying an external force by using a second sensor disposed in a partial area in a direction corresponding to a movement direction of the second area among the first area according to a changing from the first state to the second state; and
based on at least one of the external force or the characteristic value, controlling the motor to change the area exposed to the outside among the second area.

16. An electronic device comprising:
a flexible display comprising a first area and a second area extending from the first area, the first area being exposed to an outside of the electronic device in a first state, at least a part of the second area being exposed to the outside together with the first area in a second state different from the first state;
a motor configured to move the at least the part of the second area according to a driving state in the first state and the second state;
a plurality of sensors arranged in a partial area in a direction corresponding to a movement direction of the second area among the first area according to a changing from the first state to the second state; and a processor electrically connected to the flexible display, the motor, and the plurality of sensors, wherein the processor is configured to:
  in response to changing from the first state to the second state, identify a characteristic value related to the motor,
  based on an input of a user gripping the electronic device being detected while changing from the first state to the second state, identify an external force by using one of the plurality of sensors, and
  based on at least one of the characteristic value or the external force, control the motor to change an area exposed to the outside among the second area.

17. The electronic device of claim 16, wherein the processor is further configured to:
  in response to the input of the user being detected while changing from the first state to the second state, identify the external force according to the detection of the input of the user by using a grip sensor of the plurality of sensors.

18. The electronic device of claim 16, wherein the processor is further configured to:
  in response to the input of the user not being detected while changing from the first state to the second state, identify the external force by using a pressure sensor of the plurality of sensors.

19. The electronic device of claim 16, wherein the processor is further configured to:
  based on a torque of the motor, determine a plurality of configuration ranges related to the characteristic value, and
  identify whether the identified characteristic value is included at least one of the plurality of configuration ranges.

20. The electronic device of claim 19, wherein the processor is further configured to:
  determine the plurality of configuration ranges based on a type of an event related to an execution of a predetermined application in the first state.

* * * * *